United States Patent
Keshavaraj

(10) Patent No.: US 7,318,603 B2
(45) Date of Patent: Jan. 15, 2008

(54) AIRBAG CUSHION AND METHOD OF MAKING AIRBAG CUSHION

(75) Inventor: Ramesh Keshavaraj, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 219 days.

(21) Appl. No.: 10/383,396

(22) Filed: Mar. 7, 2003

(65) Prior Publication Data

US 2003/0178817 A1 Sep. 25, 2003

Related U.S. Application Data

(62) Division of application No. 09/813,632, filed on Mar. 21, 2001, now Pat. No. 6,560,832, which is a continuation of application No. 09/365,372, filed on Jul. 30, 1999, now Pat. No. 6,472,033.

(51) Int. Cl.
*B60R 21/16* (2006.01)

(52) U.S. Cl. .................... 280/743.1; 280/728.1

(58) Field of Classification Search .............. 280/743.1, 280/728.1
See application file for complete search history.

(56) References Cited

U.S. PATENT DOCUMENTS

| | | | |
|---|---|---|---|
| 3,792,873 A | 2/1974 | Buchner et al. ...... 280/150 AB |
| 3,810,654 A | * 5/1974 | DeBano et al. ........... 280/728.1 |
| 4,312,392 A | 1/1982 | Sekiguchi ...................... 150/3 |
| 4,773,142 A | 9/1988 | Davis et al. ................. 29/91.1 |
| 4,921,735 A | 5/1990 | Bloch ......................... 428/34.9 |
| 4,944,529 A | 7/1990 | Backhaus .................... 280/743 |
| 5,087,071 A | 2/1992 | Wallner et al. ............. 280/743 |
| 5,090,729 A | 2/1992 | Watanabe .................... 280/743 |
| 5,093,163 A | 3/1992 | Krummheuer et al. ...... 428/35.1 |
| 5,110,666 A | 5/1992 | Menzel et al. ............... 428/196 |
| 5,222,932 A | 6/1993 | Fontecchio .................. 493/210 |
| 5,236,775 A | 8/1993 | Swoboda et al. ............ 428/225 |
| 5,277,230 A | 1/1994 | Sollars, Jr. ................... 139/389 |
| 5,310,216 A | 5/1994 | Wehner et al. .............. 280/743 |
| 5,316,337 A | 5/1994 | Yamaji et al. ............... 280/743 |
| 5,356,680 A | 10/1994 | Krummheuer et al. ...... 428/36.1 |
| 5,365,651 A | 11/1994 | Rogers et al. ................. 29/468 |
| 5,405,164 A | 4/1995 | Paxton et al. ............... 280/728 |
| 5,407,223 A | 4/1995 | Lauritzen et al. ........... 280/728 |
| 5,423,273 A | 6/1995 | Hawthorn et al. ........... 112/441 |
| 5,454,587 A | 10/1995 | Halford et al. ........... 280/728.1 |
| 5,454,594 A | 10/1995 | Krickl ...................... 280/743.1 |
| 5,456,493 A | * 10/1995 | Bauer et al. .............. 280/743.1 |

(Continued)

FOREIGN PATENT DOCUMENTS

| WO | WO 01/08933 | 2/2001 |
|---|---|---|
| WO | WO 01/81125 | 11/2001 |

*Primary Examiner*—Ruth Ilan
(74) *Attorney, Agent, or Firm*—Terry T. Moyer; John E. Vick, Jr.

(57) ABSTRACT

The present invention relates to an airbag cushion which exhibits a low amount of seam usage (in order to attach at least two fabric panels or portions of a panel together) in correlation to an overall high amount of available inflation airspace within the cushion itself. These correlated elements are now combined for the first time in what is defined as an effective seam usage index (being the quotient of the length of overall seams on the cushions and the available inflation airspace volume). The inventive cushion must have at least one substantially straight seam and must possess an effective seam usage factor of less than about 0.11. A cushion exhibiting such a low seam usage factor and also comprising an integrated looped pocket for the disposition of an inflator can is also provided as well as an overall vehicle restraint system comprising the inventive airbag cushion.

16 Claims, 11 Drawing Sheets

U.S. PATENT DOCUMENTS

| | | |
|---|---|---|
| 5,458,364 A | 10/1995 | Mueller et al. .......... 280/728.2 |
| 5,477,890 A | 12/1995 | Krummheuer et al. ...... 139/291 |
| 5,498,024 A | 3/1996 | Caruso, Jr. et al. ...... 280/728.2 |
| 5,503,197 A | 4/1996 | Bower et al. .......... 139/435.1 |
| 5,508,073 A | 4/1996 | Krummheuer et al. ..... 428/35.1 |
| 5,520,414 A | 5/1996 | Bishop .................. 280/743.1 |
| 5,533,755 A | 7/1996 | Nelsen et al. ............ 280/743.1 |
| 5,544,911 A | 8/1996 | Vine ...................... 280/728.2 |
| 5,547,212 A | 8/1996 | Dyer et al. .............. 280/728.2 |
| 5,553,886 A | 9/1996 | Gunn et al. .............. 280/728.2 |
| 5,560,645 A | 10/1996 | Lewis et al. |
| 5,564,738 A | 10/1996 | Johnson .................... 280/736 |
| 5,564,739 A | 10/1996 | Davidson ................... 280/736 |
| 5,566,973 A | 10/1996 | Green et al. ............. 280/728.2 |
| 5,620,200 A | 4/1997 | Garner et al. ............ 280/728.2 |
| 5,652,389 A | 7/1997 | Schaps et al. ................ 73/643 |
| 5,683,100 A | 11/1997 | Enders ................... 280/728.2 |
| 5,692,777 A | 12/1997 | Tochacek et al. ........ 280/743.1 |
| 5,704,402 A | 1/1998 | Bowen et al. .......... 280/743.1 |
| 5,709,405 A | 1/1998 | Saderholm et al. ......... 280/736 |
| 5,720,234 A | 2/1998 | Hammer ................. 112/475.08 |
| 5,794,974 A | 8/1998 | Niederman et al. ...... 280/743.1 |
| 5,865,467 A * | 2/1999 | Bito et al. ................ 280/743.1 |
| 5,945,184 A | 8/1999 | Nagata et al. ............. 428/35.2 |
| 5,975,571 A | 11/1999 | Ford et al. ............. 280/743.1 |
| 6,074,701 A | 6/2000 | Beasley, Jr. .................. 427/384 |
| 6,086,095 A | 7/2000 | Keshavaraj .............. 280/743.1 |
| 6,089,599 A | 7/2000 | Schimmoller et al. ...... 280/740 |
| 6,168,203 B1 * | 1/2001 | Amamori ................. 280/743.1 |
| 6,173,667 B1 | 1/2001 | Muessig et al. ........ 112/475.06 |
| 6,180,204 B1 | 1/2001 | Keshavaraj .................. 428/81 |
| 6,375,213 B1 | 4/2002 | Suzuki |
| 6,472,033 B1 | 10/2002 | Keshavaraj |
| 6,560,832 B2 | 5/2003 | Keshavaraj |
| 2002/0008374 A1 | 1/2002 | Keshavaraj |
| 2002/0027351 A1 | 3/2002 | Keshavaraj |
| 2002/0041086 A1 | 4/2002 | Keshavaraj |
| 2002/0056977 A1 | 5/2002 | Keshavaraj |
| 2002/0060449 A1 | 5/2002 | Keshavaraj |
| 2003/0034637 A1 | 2/2003 | Wang et al. |

* cited by examiner

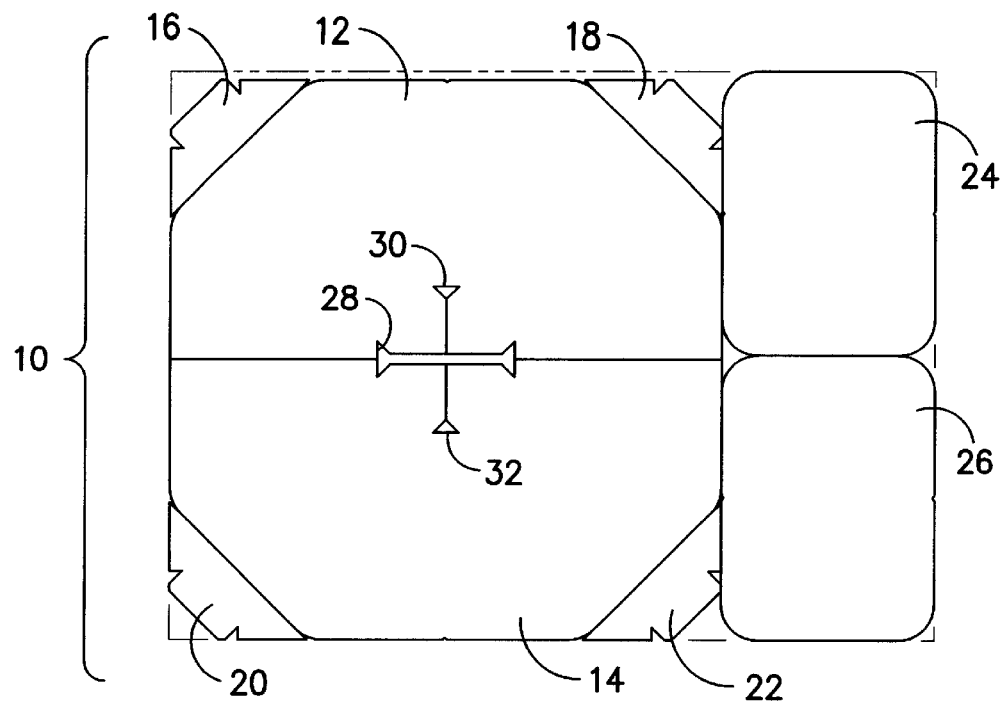
FIG. -1-
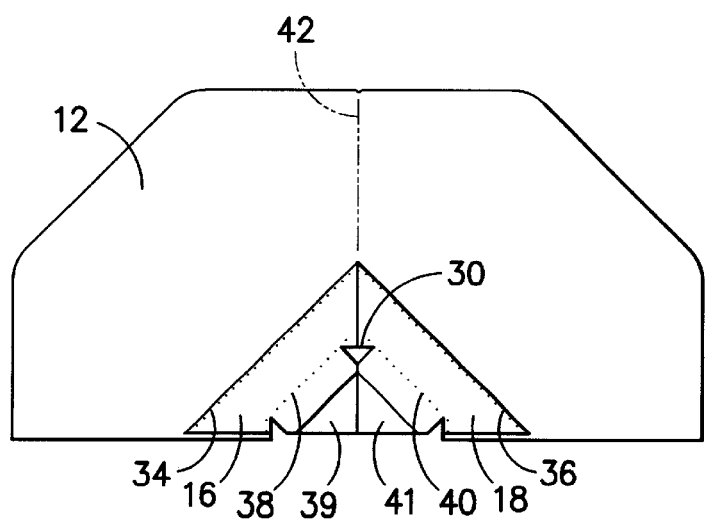
FIG. -2-

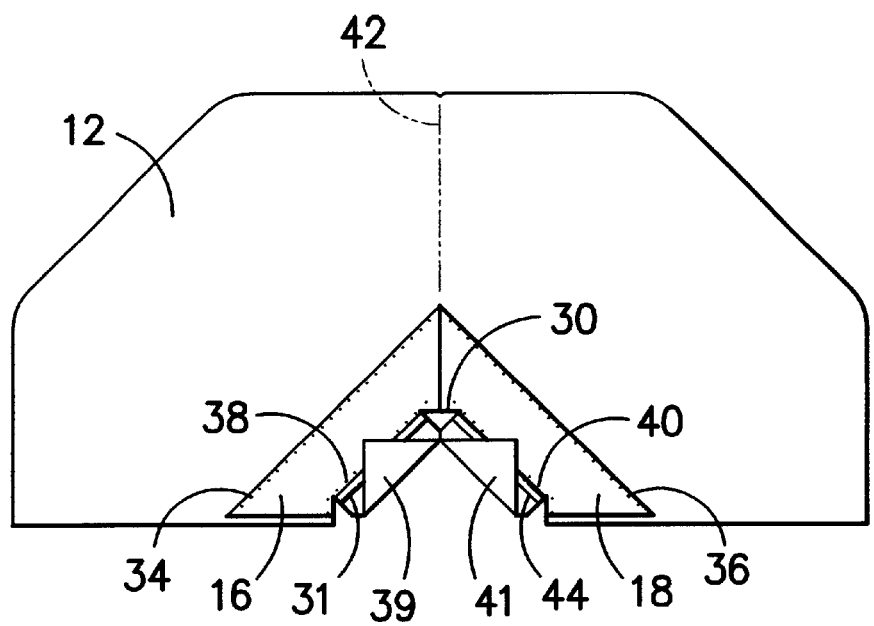
FIG. -3-
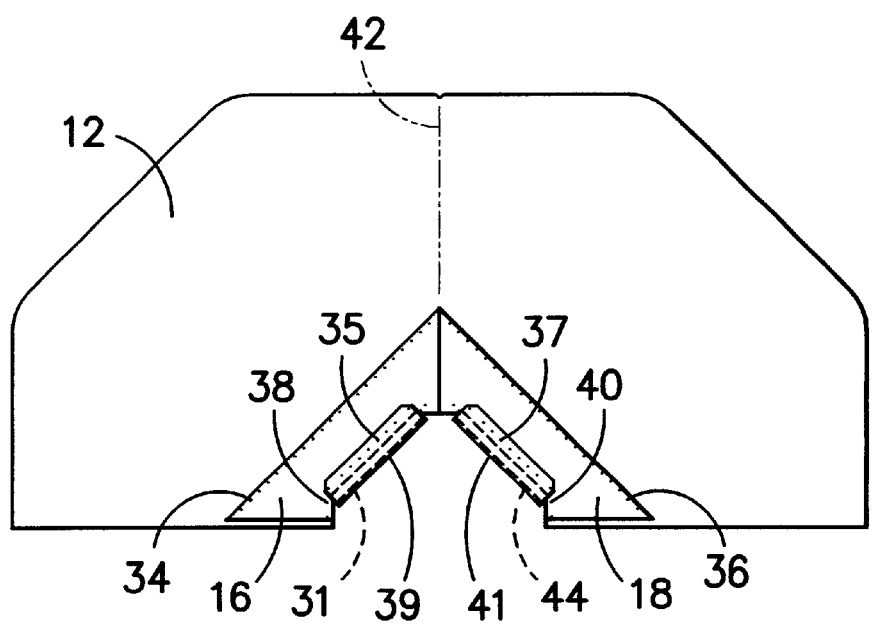
FIG. -4-

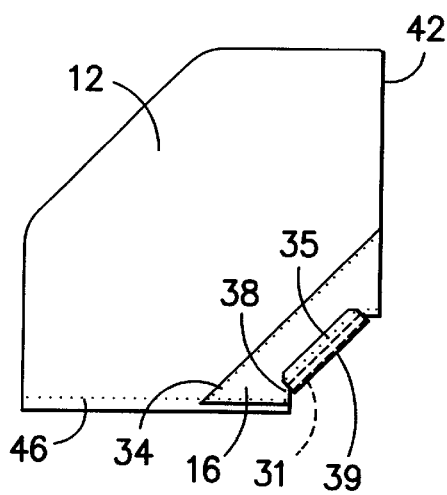
FIG. -5-
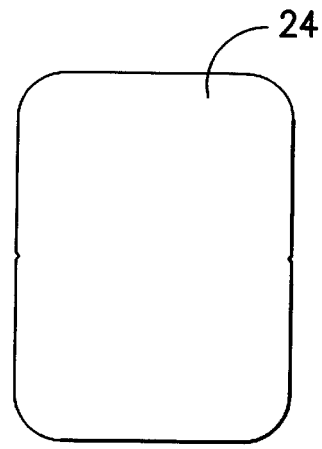
FIG. -6-
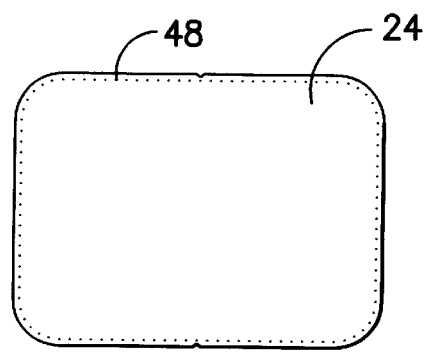
FIG. -7-
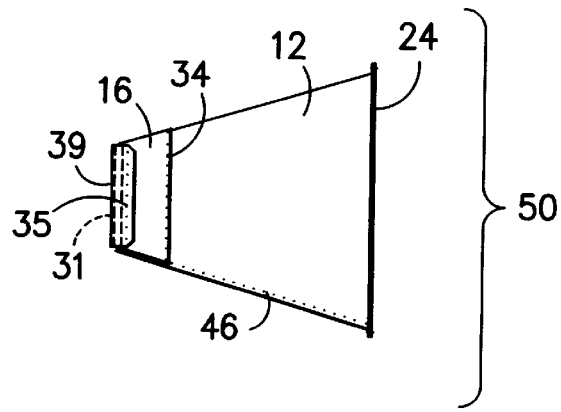
FIG. -8-

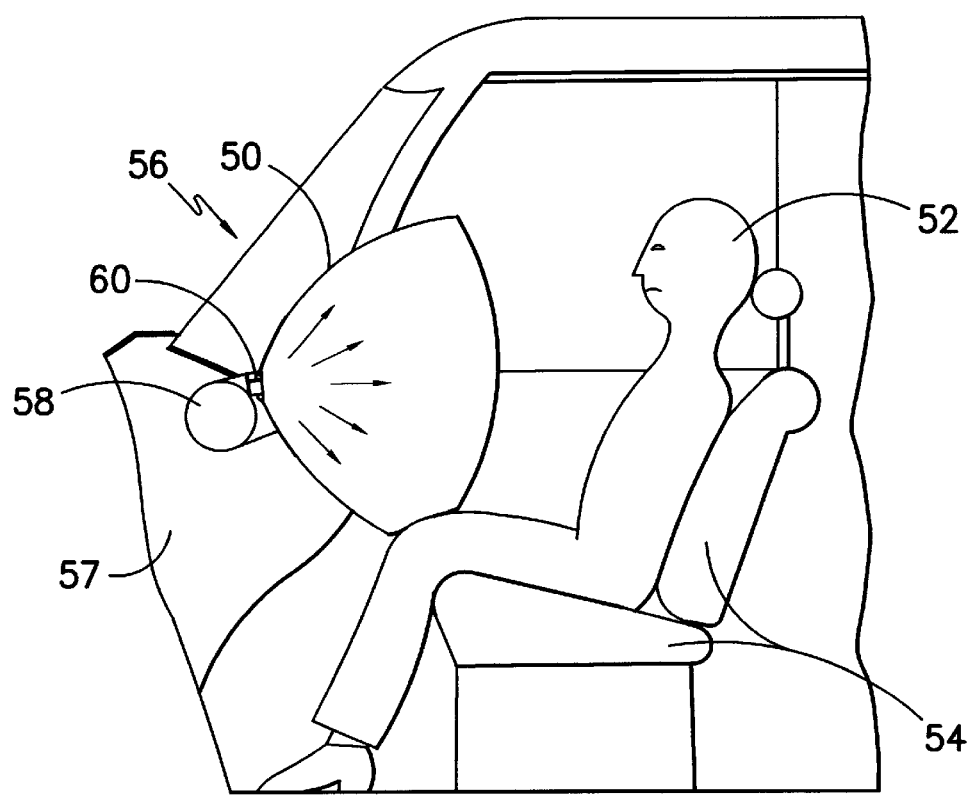
FIG. -9-

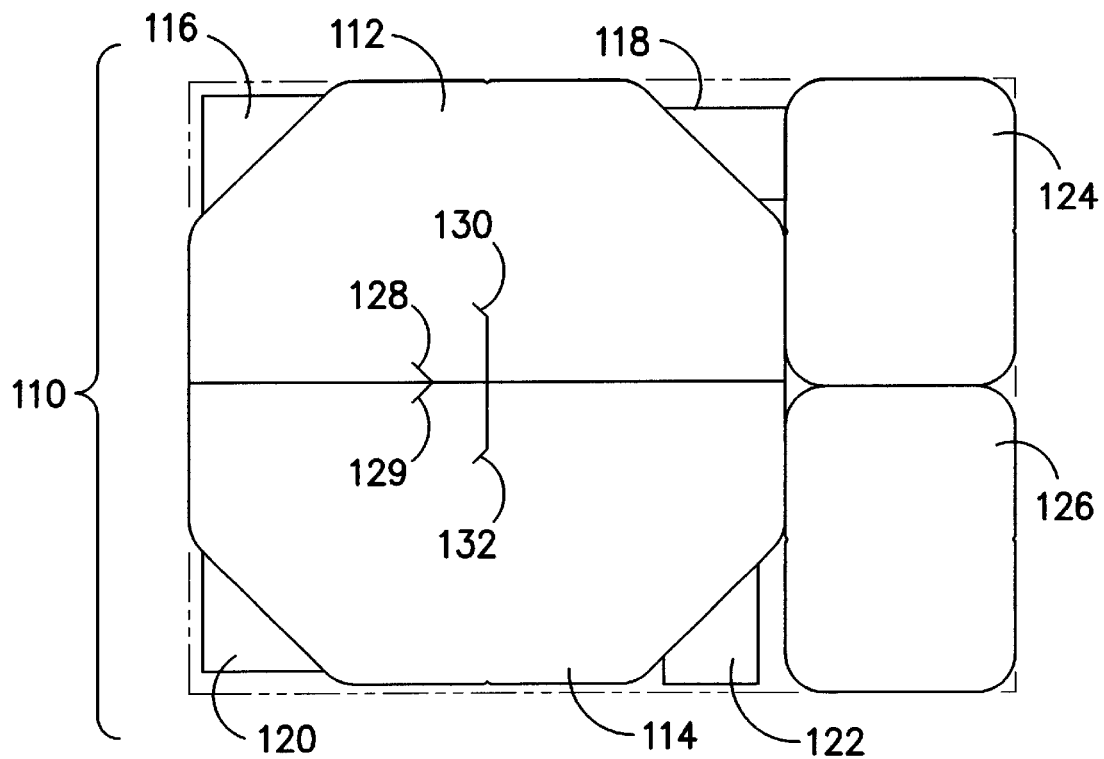
FIG. -10-
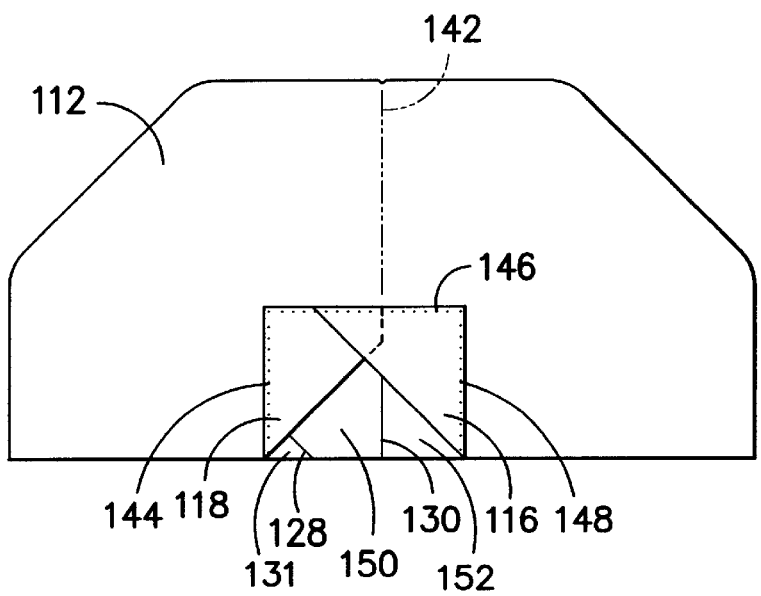
FIG. -11-

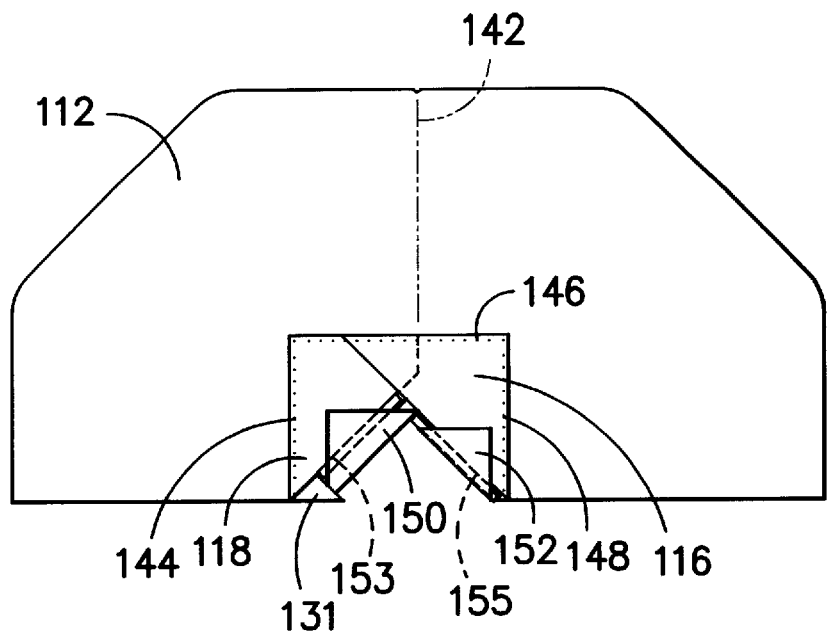
FIG. 12-
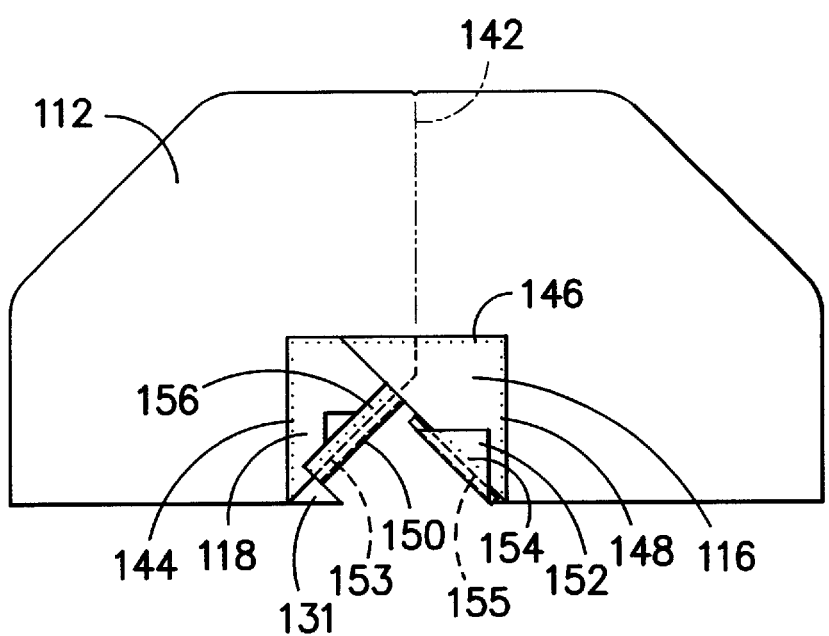
FIG. -13-

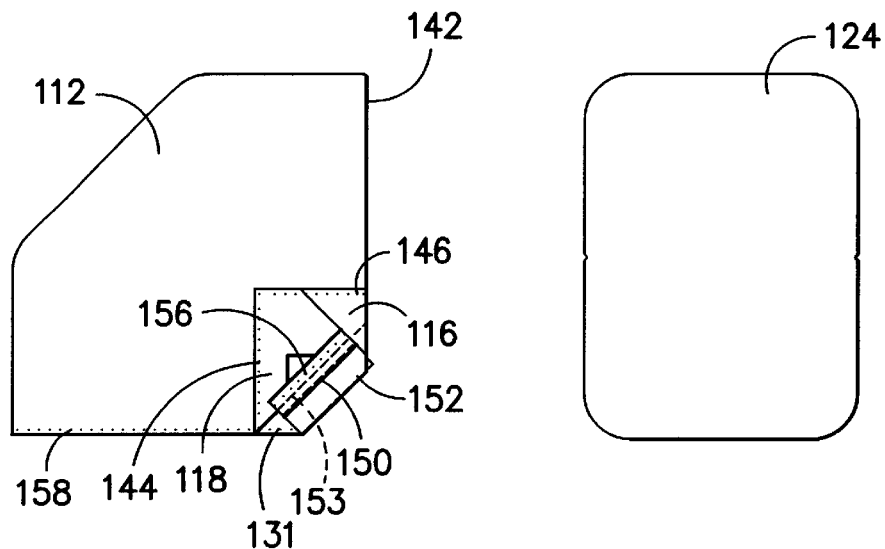
FIG. —14—
FIG. —15—
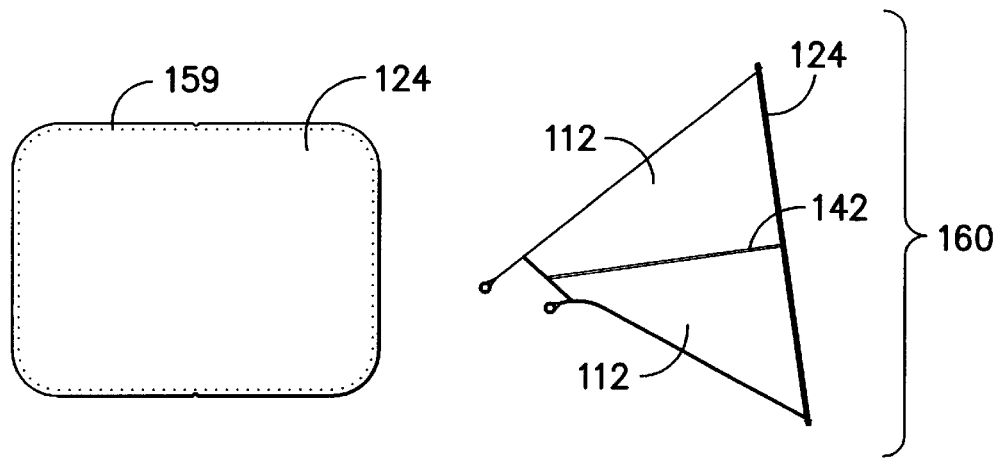
FIG. —16—
FIG. —17—

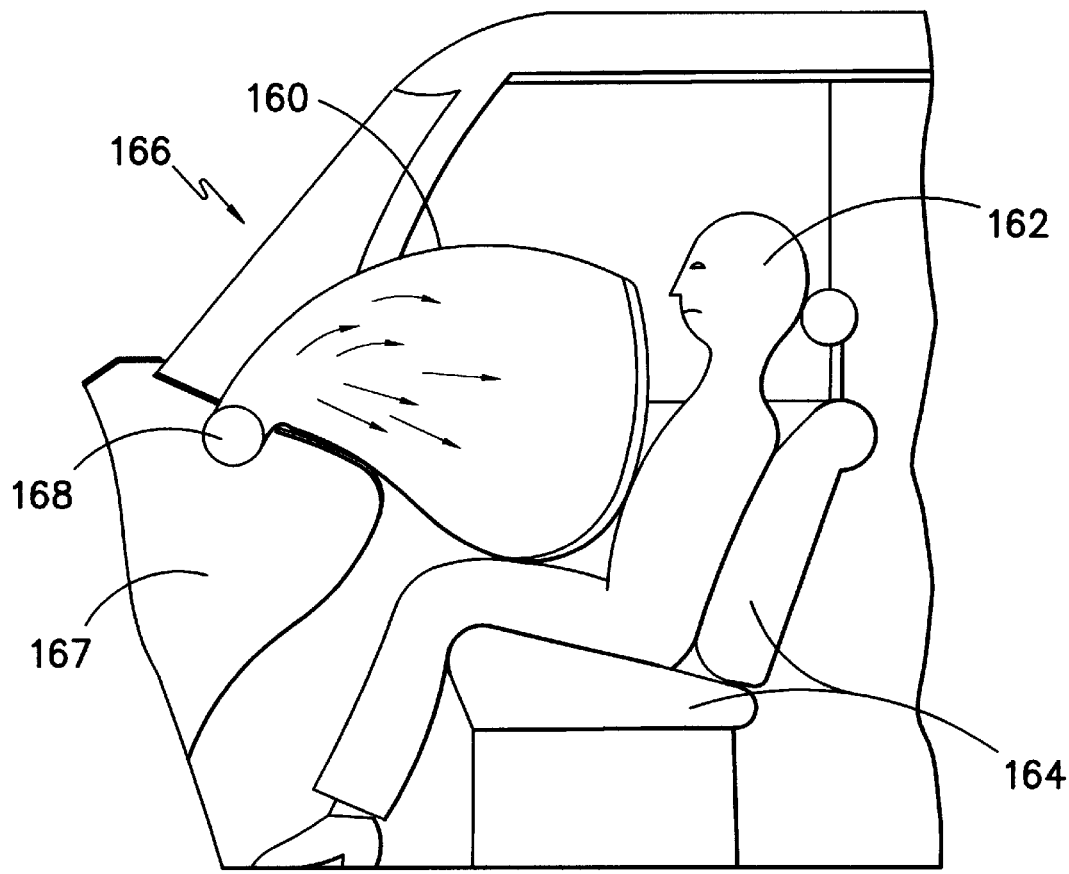
FIG. -18-

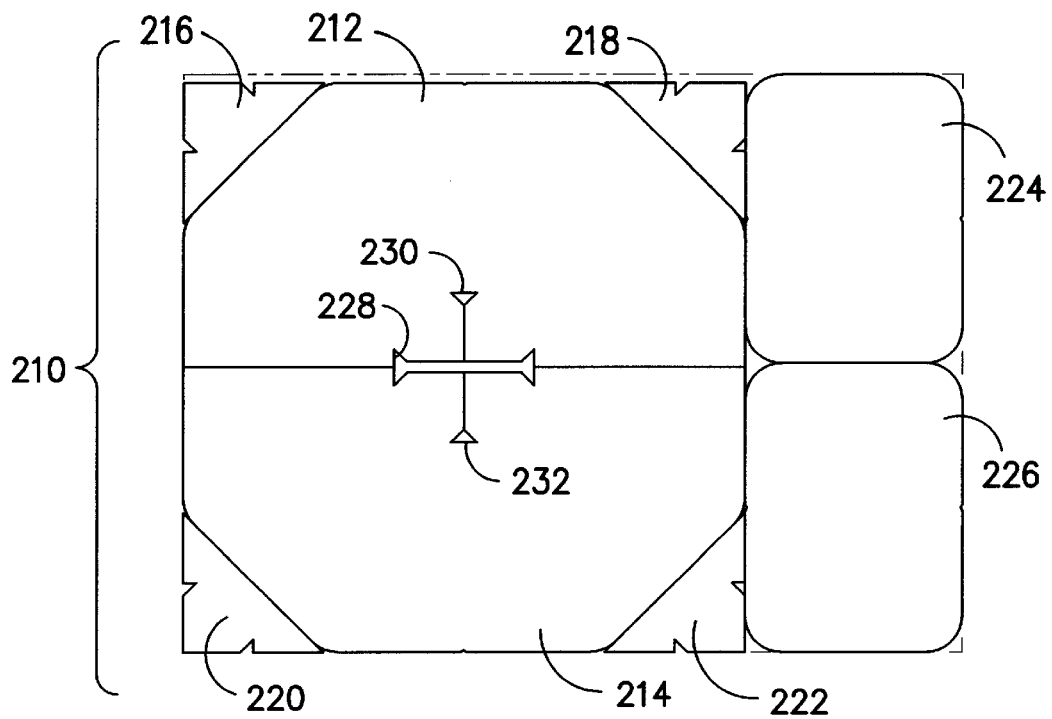
FIG. -19-
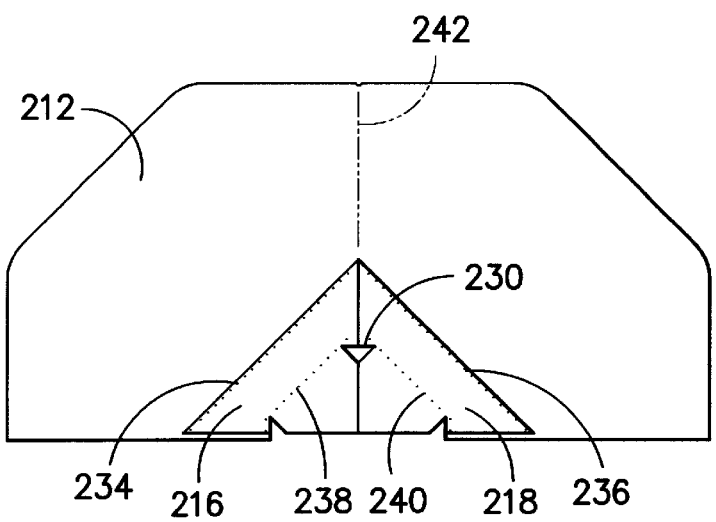
FIG. -20-

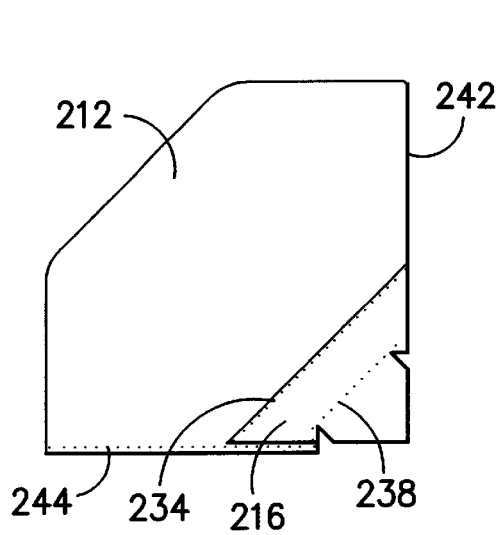
FIG. -21-
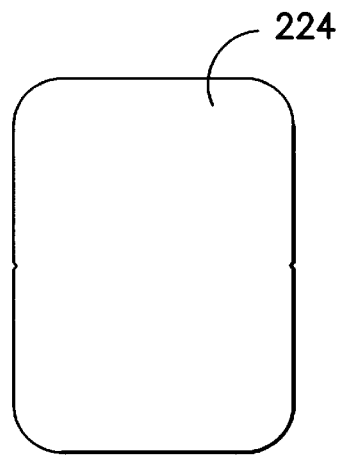
FIG. -22-
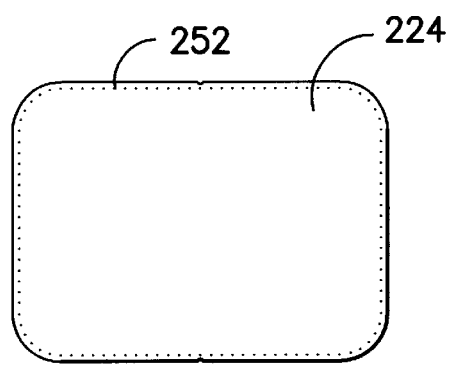
FIG. -23-
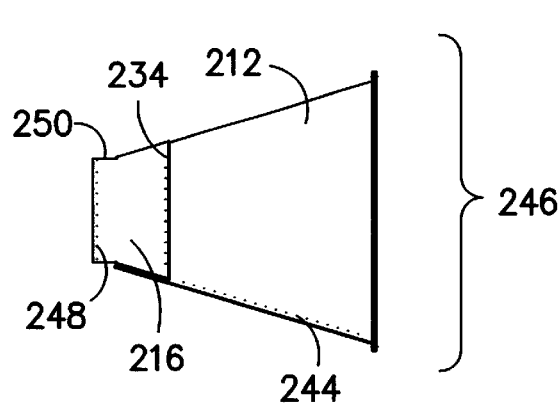
FIG. -24-

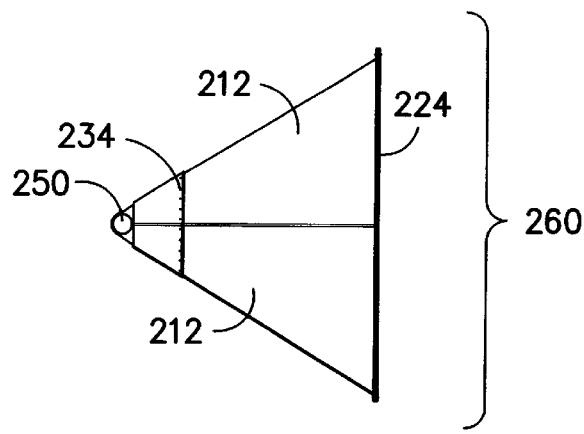
FIG. -25-
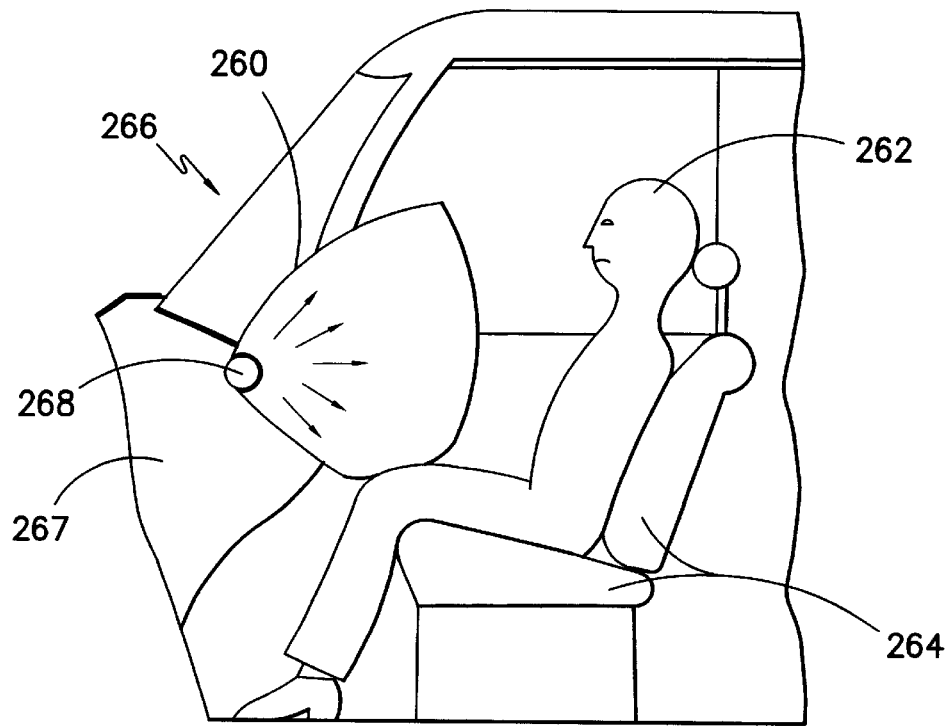
FIG. -26-

AIRBAG CUSHION AND METHOD OF MAKING AIRBAG CUSHION

CROSS-REFERENCE TO RELATED APPLICATIONS

This application is a divisional of pending U.S. patent application Ser. No. 09/813,632, filed on Mar. 21, 2001, now U.S. Pat. No. 6,560,832 which is a continuation of U.S. patent application Ser. No. 09/365,372, filed on Jul. 30, 1999, and issued on Oct. 29, 2002, to Keshavaraj as U.S. Pat. No. 6,472,033. These references are all hereby incorporated herein in their entirety by specific reference thereto.

FIELD OF THE INVENTION

The present invention relates to an airbag cushion which exhibits a low amount of seam usage (in order to attach at least two fabric panels or portions of a panel together) in correlation to an overall high amount of available inflation airspace within the cushion itself. These correlated elements are now combined for the first time in what is defined as an effective seam usage index (being the quotient of the length of overall seams on the cushions and the available inflation airspace volume). The inventive cushion must have at least one substantially straight seam and must possess an effective seam usage factor of less than about 0.11. A cushion exhibiting such a low seam usage factor and also comprising an integrated looped pocket for the disposition of an inflator can is also provided as well as an overall vehicle restraint system comprising the inventive airbag cushion.

BACKGROUND OF THE PRIOR ART

Inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filing the cushion to a deployed state which can absorb the impact of the forward movement of a body and dissipate its energy by means of rapid venting of the gas. The entire sequence of events occurs within about 30 milliseconds. In the undeployed state, the cushion is stored in or near the steering column, the dashboard, in a door, or in the back of a front seat placing the cushion in close proximity to the person or object it is to protect.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,416 to Bishop, issued May 28, 1996; U.S. Pat. No. 5,454,594 to Krickl issued Oct. 3, 1995; U.S. Pat. No. 5,423,273 to Hawthorn et al. issued Jun. 13, 1995; U.S. Pat. No. 5,316,337 to Yamaji et al. issued May 31, 1994; U.S. Pat. No. 5,310,216 to Wehner et al. issued May 10, 1994; U.S. Pat. No. 5,090,729 to Watanabe issued Feb. 25, 1992; U.S. Pat. No. 5,087,071 to Wallner et al. issued Feb. 11, 1992; U.S. Pat. No. 4,944,529 to Backhaus issued Jul. 31, 1990; and U.S. Pat. No. 3,792,873 to Buchner et al. issued Feb. 19, 1974, all of which are incorporated herein by reference.

The majority of commercially used restraint cushions are formed of woven fabric materials utilizing multifilament synthetic yarns of materials such as polyester, nylon 6 or nylon 6,6 polymers. Representative fabrics for such use are disclosed in U.S. Pat. No. 4,921,735 to Bloch issued May 1, 1990; U.S. Pat. No. 5,093,163 to Krummheuer et al. issued Mar. 3, 1992; U.S. Pat. No. 5,110,666 to Menzel et al. issued May 5, 1992; U.S. Pat. No. 5,236,775 to Swoboda et al. Aug. 17, 1993; U.S. Pat. No. 5,277,230 to Sollars, Jr. issued Jan. 11, 1994; U.S. Pat. No. 5,356,680 to Krummheuer et al. Oct. 18, 1994; U.S. Pat. No. 5,477,890 to Krummheuer et al. issued Dec. 26, 1995; U.S. Pat. No. 5,508,073 to Krummheuer et al., issued Apr. 16, 1996; U.S. Pat. No. 5,503,197 to Bower et al. issued Apr. 2, 1996 and U.S. Pat. No. 5,704,402 to Bowen et al. issued Jan. 6, 1998, all of which are incorporated herein by reference.

As will be appreciated, the permeability of the cushion structure is an important factor in determining the rate of inflation and subsequent rapid deflation following the impact event. In order to control the overall permeability of the cushion, it may be desirable to use differing materials in different regions of the cushion. Thus, the use of several fabric panels in construction of the cushion may prove to be a useful design feature. The use of multiple fabric panels in the cushion structure also permits the development of relatively complex three dimensional geometries which may be of benefit in the formation of cushions for passenger side applications wherein a full bodied cushion is desired. While the use of multiple fabric panels provides several advantages in terms of permeability manipulation and geometric design, the use of multiple fabric panels for use in passenger side restraint cushions has historically required the assembly of panels having multiple different geometries involving multiple curved seams.

As will be appreciated, an important consideration in cutting panel structures from a base material is the ability to maximize the number of panels which can be cut from a fixed area through close-packed nesting of the panels. It has been found that minimizing the number of different geometries making up panels in the cushion and using geometries with substantially straight line perimeter configurations generally permits an enhanced number of panels to be cut from the base material. The use of panels having generally straight line profiles has the added benefit of permitting the panels to be attached to one another using substantially straight seams or be substantially formed during the weaving process using a jacquard or dobby loom. For the purposes of this invention, the term "seam" is to be understood as any point of attachment between different fabric panels or different portions of the same fabric panel. Thus, a seam may be sewn (such as with thread), welded (such as by ultrasonic stitching), woven (such as on a jacquard or dobby loom, as merely examples), and the like. The key issue regarding seam length within this invention pertains to the ability to form a high available inflation airspace volume cushion with the lowest amount of labor needed. Since sewing, welding, etc., procedures to connect panels or portions of panels greatly increases the time necessary to produce airbag cushions, it is highly desirable to reduce the labor time which can be accomplished through the reduction in the length of seams required. Substantially straight seam configurations thus provide more cost-effective methods of producing such airbags.

However, even with the utilization of substantially straight seams to produce airbags cushions, a problem still resides in the need for labor-intensive cutting and sewing operations for large-scale manufacture. There remains a need then to reduce the amount of time to produce airbag cushions while simultaneously providing the greatest amount of fabric to allow for a sufficient volume of air (gas) to inflate the target airbag cushion during an inflation event (herein described as "available inflation airspace"). Such a desired method and product has not been available, particularly for passenger-side airbags which, as noted previously, require greater amounts of fabric for larger volumes of air (gas) to provide the greatest amount of protection area to a passenger. With greater amounts of fabric needed, generally this has translated into the need for longer seams to connect and attach fabric panels, which in turn translates into greater amounts of time needed for sewing, and the like, operations. Thus, a need exists to produce high available inflation airspace volume airbag cushions with minimal requirements in seam lengths to manufacture the overall cushion product. The prior art has not accorded any advancements or even discussions to this effect.

SUMMARY OF THE INVENTION

In view of the foregoing, it is a general object of the present invention to provide a cost-effective, easy to manufacture airbag cushion for utilization within a vehicle restraint system. The term vehicle restraint system is intended to mean both inflatable occupant restraining cushion and the mechanical and chemical components (such as the inflation means, ignition means, propellant, and the like). It is a more particular object of the present invention to provide a vehicle restraint system wherein the target airbag cushion preferably requires all substantially straight seams to attach its plurality fabric components together (although as noted above, other configured seams may also be used as long the overall required effective seam usage factor is met). A further object of this invention is to provide an easy-to-assemble airbag cushion which is minimally labor-intensive to manufacture, which also comprises an integrated looped pocket for the disposition of an inflator can within the airbag cushion. It is still a further object of this invention to provide a vehicle restraint system comprising an airbag cushion which provides the maximum amount of available inflation airspace volume simultaneously with the lowest length of seam (or seams) necessary to manufacture the cushion. Another object of the invention is to provide a method of making a low cost airbag cushion (due to low levels of labor required to sew the component parts together) of simple and structurally efficient design.

To achieve these and other objects and in accordance with the purpose of the invention, as embodied and broadly described herein, the present invention provides an airbag cushion having at least one substantially straight seam, wherein said airbag cushion possesses an effective seam usage factor of less than about 0.11, wherein said seam usage factor is derived from a seam usage index which concerns (and is defined as) the quotient of the total length of all seams present within the airbag cushion (measured in meters) over the total volume of available inflation airspace within the airbag cushion (measured in liters). As noted above, the seam itself may be applied by any well known operation including, but not limited to, thread-stitching, ultrasonic stitching, and the like, or could be woven within the fabric on a jacquard or dobby loom, and the like. The term "available inflation airspace," as eluded to above, connotes the volume within which air (gas) would be transferred from an inflation assembly to the airbag cushion during inflation, and thus a consequent inflation event. Such an airbag cushion must generally have at least one substantially straight seam, although, preferably, each seam possesses such a specific configuration. In order to produce such a specific airbag cushion, in fact, it is evident that the amount of sewing, stitching, and the like, required to form the end-product must be very low A curved seam, although possible in this invention, requires potentially longer lengths of thread, etc., in order to attach the different fabric components of the target cushion. As a result, the utilization of curved, or other non-straight seams, should be minimized.

The effective seam usage factor (as defined within the correlating seam usage index formula, above) for the inventive airbag cushion then is preferably less than about 0.10, more preferably less than 0.09, still more preferably less than 0.07, even more preferably less than 0.06, and most preferably lower than 0.05. Thus, the volume of available inflation airspace within the airbag cushion should be as great as possible with the length of seam reduced to its absolute minimum.

A one-piece construction will generally have a relatively low available inflation airspace volume, although the length of the total number of seams may be quite low; a driver-side airbag will generally consist of many seams (of relatively large overall length), particularly curved seams, and a correlative relatively low volume of available airspace; and the prior art passenger-side airbags require complex sewing operations with numerous and rather long seams. Although the available inflation airspace volume in such passenger-side airbags is rather large, the total length of all the utilized seams is generally too great to meet the aforementioned effective seam usage factor within the index.

The present invention also provides an airbag cushion possessing the required effective seam usage factor which also comprises a looped pocket for introduction of the inflator can of an inflator assembly. In the most preferred embodiment one large body panel is utilized having two mirror-image portions which, when folded over along the middle of the fabric panel, the boundaries of both portions are aligned. One substantially straight seam is then utilized to seal the adjacent (and similarly configured) side to the already-folded side and two opening will remain. The large opening is then covered by one panel of rectilinear shape; the small opening (opposite the large opening) will have extra fabric which can be overlapped (to provide extra reinforcing fabric at the point of potential inflation) and sewn to form the desired pocket in which to dispose the inflation can. This embodiment is discussed below in greater detail.

Additional objects and advantages of the invention will be set forth in part in the description which follows, and in part will be obvious from the description, or may be learned by practice for the invention. It is to be understood that both the foregoing general description and the following detailed description of preferred embodiments are exemplary and explanatory only, and are not to be viewed as in any way restricting the scope of the invention as set forth in the claims.

BRIEF DESCRIPTION OF THE DRAWINGS

The accompanying drawings, which are incorporated in and constitute a part of this specification, illustrate several potentially preferred embodiments of the invention (the groupings of FIGS. 1–9, 10–18 and 19–26 each represent individual preferred embodiments) and together with the description serve to explain the principles of the invention wherein:

FIG. 1 is an aerial view of a portion of a fabric web with lines indicating the specific preferred locations for cutting to form two sets of fabric panels to manufacture two separate inventive cushions, each for the inclusion within a vehicle restraint system configured within a module which is stored substantially vertically.

FIG. 2 is an aerial view of a preferred cut fabric panel with second and third smaller preferred cut panels connected thereto.

FIG. 3 is an aerial view of the connected preferred cut fabric panels showing the first folding step in producing the mouth portion of the target cushion.

FIG. 4 is an aerial view of the connected preferred cut fabric panels showing the second folding step in producing the mouth portion of the target cushion.

FIG. 5 is an aerial view of the connected preferred cut fabric panels showing the third folding step in producing the mouth portion of the target cushion as well as the entire connected fabric panel composite folded over and connected to itself.

FIG. 6 is an aerial view of the preferred cut fabric front panel of the target cushion.

FIG. 7 is a front view of the finished target cushion showing the preferred front panel and the substantially straight seams connecting the front panel to the remaining preferred cut fabric panels.

FIG. 8 is a side view of the finished, unfolded, and non-inflated, target cushion.

FIG. 9 is a cut-away side view of a vehicle for transporting an occupant illustrating the deployment of an inflatable restraint cushion within a vehicle restraint system according to the present invention.

FIG. 10 is an aerial view of a portion of a fabric web with lines indicating the specific preferred locations for cutting to form two sets of fabric panels to manufacture two separate inventive cushions, each for the inclusion within a vehicle restraint system configured within a module which is stored substantially horizontally.

FIG. 11 is an aerial view of a preferred cut fabric panel with second and third smaller preferred cut panels connected thereto.

FIG. 12 is an aerial view of the connected preferred cut fabric panels showing the first folding step in producing the mouth portion of the target cushion.

FIG. 13 is an aerial view of the connected preferred cut fabric panels showing the second folding step in producing the mouth portion of the target cushion.

FIG. 14 is an aerial view of the connected preferred cut fabric panels showing the third folding step in producing the mouth portion of the target cushion as well as the entire connected fabric panel composite folded over and connected to itself.

FIG. 15 is an aerial view of the preferred cut fabric front panel of the target cushion.

FIG. 16 is a front view of the finished target cushion showing the preferred front panel and the substantially straight seams connecting the front panel to the remaining preferred cut fabric panels.

FIG. 17 is a side view of the finished, unfolded, and non-inflated, target cushion.

FIG. 18 is a cut-away side view of a vehicle for transporting an occupant illustrating the deployment of an inflatable restraint cushion within a vehicle restraint system according to the present invention.

FIG. 19 is an aerial view of a portion of a fabric web with lines indicating the specific preferred locations for cutting to form two sets of fabric panels to manufacture two separate inventive cushions, each which provide means for an integrated mouth to form a pocket for the disposition of an inflation can therein.

FIG. 20 is an aerial view of a preferred cut fabric panel with second and third smaller preferred cut panels connected thereto.

FIG. 21 is an aerial view of the connected preferred cut fabric panels showing the entire connected fabric panel composite folded over and connected to itself.

FIG. 22 is an aerial view of the preferred cut fabric front panel of the target cushion.

FIG. 23 is a front view of the finished target cushion showing the preferred front panel and the substantially straight seams connecting the front panel to the remaining preferred cut fabric panels.

FIG. 24 is a top view of the finished, unfolded and non-inflated, target cushion.

FIG. 25 is a side view of the finished, unfolded and non-inflated, target cushion including the integrated mouth structure for the disposition of an inflation can therein.

FIG. 26 is a cut-away side view of a vehicle for transporting an occupant illustrating the deployment of an inflatable restraint cushion within a vehicle restraint system according to the present invention.

DESCRIPTION OF THE PREFERRED EMBODIMENTS

Reference will now be made in detail to potentially preferred embodiments of the invention, examples of which have been illustrated in the accompanying drawings. It is to be understood that it is in no way intended to limit the invention to such illustrated and described embodiments. On the contrary, it is intended to cover all alternatives, modifications and equivalents as may be included within the true spirit and scope of the invention as defined by the appended claims and equivalents thereto.

Turning now to the drawings, wherein like elements are denoted by like reference numerals throughout the various views, in FIG. 1 there is shown a fabric web 10, wherein eight fabric panels to be cut 12, 14, 16, 18, 20, 22, 24, and 26 have been outlined. Also, specific fabrics pieces to be removed and slits 28, 30, 32 within the two largest fabric panels 12, 14 are outlined as well. The fabric web 10 in this specific example comprised nylon 6,6, 630 denier yarns, woven on a jacquard loom into a fabric 10 comprising 41 picks by 41 ends per inch.

In FIG. 2, two smaller preferred fabric panels 16, 18 have been connected to one preferred large fabric panel 12 by substantially straight seams 34, 36, 38, 40. The composite fabric structure now has two small fabric portions 39, 41 uncovered by the two smaller fabric panels 16, 18. The free space 30 remains and an imaginary straight line 42 denotes the future fold line within the fabric composite of the fabric panels 12, 16, 18.

In FIG. 3, tie-rods 31, 44 have been placed over the small fabric portions 39, 41 parallel to the seams 38, 40, and the fabric portions 39, 41 have been folded back in a manner to form a right angle at the point of contact between the two portions 39, 41.

In FIG. 4, the small fabric portions 39, 41 have been folded over once again and seams 35, 37 have been produced to connect the fabric portions 39, 41 to themselves and to the smaller fabric panels 16, 18. The folded over fabric portions 39, 41 provide reinforcement in order to withstand inflation pressures at the mouth opening of the cushion.

In FIG. 5, the fabric panel 12 has been folded over imaginary line 42 (in half) leaving one smaller fabric panel 16 in view (the other is not illustrated as it is now located on the bottom portion of fabric panel 12 directly beneath smaller fabric panel 18). A seam 46 connects fabric panel 12 to itself and also connects the smaller fabric panels 16, 18 both to the larger panel 12 and to themselves. Upon unfolding of the connected composite, the non-connected ends of the panel 12 will form the same shape as the front panel 24 of FIG. 6. FIG. 7 then shows the seam 48 needed to sew the non-connected ends of the large panel 12 (of FIG. 5), and FIG. 8 provides a side view of the finished cushion 50 after all the connection through seams 38, 42, 34, 46 have been made.

FIG. 9 shows a fully deployed inflatable restraint cushion 50 in opposing relation to an occupant 52 located on the front seat 54 of a vehicle 56 such as an automobile, airplane, and the like. As shown, the cushion 50 may be outwardly deployed from the dash panel 57 through an inflation means 58 from a position directly opposite the occupant 52. It is to be understood, however, that the cushion 50 may likewise be deployed from any other desired location in the vehicle 56 including the steering wheel (not illustrated), the vehicle side panels (not illustrated), the floor (not illustrated), or the backrest of the front seat 54 for disposition in opposing relation to a rear passenger (not illustrated).

In FIG. 10 there is shown a fabric web 110, wherein eight fabric panels to be cut 112, 114, 116, 118, 120, 122, 124, and 126 have been outlined. Also, specific slits 128, 129, 130, 32 within the two largest fabric panels 112, 114 are outlined as well. The fabric web 110 in this specific example comprised nylon 6,6, 630 denier yarns, woven on a jacquard loom into a fabric 110 comprising 41 picks by 41 ends per inch.

In FIG. 11, two smaller preferred fabric panels 116, 118 have been connected to one preferred large fabric panel 112 by substantially straight seams 144, 146, 148. The composite fabric structure now has two small fabric portions 131, 150, 152 uncovered by the two smaller fabric panels 116, 118. An imaginary straight line 142 denotes the future fold line within the fabric composite of the fabric panels 112, 116, 118, which is noticeably off-center in order to ultimately allow for the bag to be deployed at an angle from a horizontally disposed dashboard (not illustrated).

In FIG. 12, tie-rods 153, 155 have been placed over the small fabric portions 150, 152 and have been folded back over the tie-rods 153, 155 as shown, folded again, as in FIG. 13, and connected to themselves by seams 152, 156. The folded over fabric portions 150, 152 provide reinforcement in order to withstand inflation pressures at the mouth opening of the cushion.

In FIG. 14, the fabric panel 112 has been folded over imaginary line 142 leaving one smaller fabric panel 116 in view (the other is not illustrated as it is now located on the bottom portion of fabric panel 112 directly beneath smaller fabric panel 118). A seam 158 connects fabric panel 112 to itself and also connects the smaller fabric panels 116, 118 both to the larger panel 112 and to themselves. Upon unfolding of the connected composite, the non-connected ends of the panel 112 will form the same shape as the front panel 124 of FIG. 15. FIG. 16 then shows the seam 159 needed to sew the non-connected ends of the large panel 112 (of FIG. 14), and FIG. 17 provides a side view of the finished cushion 160.

FIG. 18 shows a fully deployed inflatable restraint cushion 160 in opposing relation to an occupant 162 located on the front seat 164 of a vehicle 166 such as an automobile, airplane, and the like. As shown, the cushion 160 may be outwardly deployed from the dash panel 167 through an inflation means 168 from a position directly opposite the occupant 162. It is to be understood, however, that the cushion 160 may likewise be deployed from any other desired location in the vehicle 166 including the steering wheel (not illustrated), the vehicle side panels (not illustrated), the floor (not illustrated), or the backrest of the front seat 164 for disposition in opposing relation to a rear passenger (not illustrated).

In FIG. 19 there is shown a fabric web 210, wherein eight fabric panels to be cut 212, 214, 216, 218, 220, 222, 224, and 226 have been outlined. Also, specific fabrics pieces to be removed and slits 228, 230, 232 within the two largest fabric panels 212, 214 are outlined as well. The fabric web 210 in this specific example comprised nylon 6,6, 630 denier yarns, woven on a jacquard loom into a fabric 210 comprising 41 picks by 41 ends per inch.

In FIG. 20, two smaller preferred fabric panels 216, 218 have been connected to one preferred large fabric panel 212 by substantially straight seams 234, 236, 238, 240. An imaginary straight line 242 denotes the future fold line within the fabric composite of the fabric panels 212, 216, 218.

In FIG. 21, the fabric panel 212 has been folded over imaginary line 242 (in half) leaving one smaller fabric panel 216 in view (the other is not illustrated as it is now located on the bottom portion of fabric panel 212 directly beneath smaller fabric panel 218). A seam 244 connects fabric panel 212 to itself and also connects the smaller fabric panels 216, 218 both to the larger panel 212 and to themselves. Upon unfolding of the connected composite, the non-connected ends of the panel 212 will form the same shape as the front panel 224 of FIG. 22. FIG. 23 then shows the seam 252 needed to sew the non-connected ends of the large panel 212 (of FIG. 21), and FIG. 24 provides a top view of a finished cushion 246 and FIG. 25 provides a side view of a finished cushion 260, with an integrated looped pocket 250 after all the connection through seams 234, 244, 248 have been made.

FIG. 26 shows a fully deployed inflatable restraint cushion 260 in opposing relation to an occupant 262 located on the front seat 264 of a vehicle 266 such as an automobile, airplane, and the like. As shown, the cushion 260 may be outwardly deployed from the dash panel 267 through an inflation means 268 from a position directly opposite the occupant 262. It is to be understood, however, that the cushion 260 may likewise be deployed from any other desired location in the vehicle 266 including the steering wheel (not illustrated), the vehicle side panels (not illustrated), the floor (not illustrated), or the backrest of the front seat 264 for disposition in opposing relation to a rear passenger (not illustrated).

These specific configurations and shapes provide the lowest overall seam usage as compared to the available inflation airspace volume. Specific measurements for each inventive cushion manufactured in this configuration (but with different amounts of utilized fabric) are further described in Table 2, below.

Each of the panels utilized in these preferred embodiments may be formed from a number of materials including by way of example only and not limitation woven fabrics, knitted fabrics, non-woven fabrics, films and combinations thereof. Woven fabrics may be preferred with woven fabrics formed of tightly woven construction such as plain or panama weave constructions being particularly preferred. Such woven fabrics may be formed from yarns of polyester, polyamides such as nylon 6 and nylon-6,6 or other suitable material as may be known to those in the skill in the art. Multifilament yarns having a relatively low denier per filament rating of not greater than about 1–4 denier per filament may be desirable for bags requiring particular good foldability.

In application, woven fabrics formed from synthetic yarns having linear densities of about 40 denier to about 1200 denier are believed to be useful in the formation of the airbag according to the present invention. Fabrics formed from yarns having linear densities of about 315 to about 840 are believed to be particularly useful, and fabrics formed from yarns having linear densities in the range of about 400 to about 650 are believed to be most useful.

While each of the panels may be formed of the same material, the panels may also be formed from differing materials and or constructions such as, without limitation, coated or uncoated fabrics. Such fabrics may provide high permeability fabric having an air permeability of about 5 CFM per square foot or higher, preferably less than about 3 CFM per square foot or less when measured at a differential pressure of 0.5 inches of water across the fabric. Fabrics having permeabilities of about 1–3 CFM per square foot may be desirable as well. Fabrics having permeabilities below 2 CFM and preferably below 1 CFM in the uncoated state may be preferred. Such fabrics which have permeabilities below 2 CFM which permeability does not substantially increase by more than a factor of about 2 when the fabric is subjected to biaxial stresses in the range of up to about 100 pounds force may be particularly preferred. Fabrics which exhibit such characteristics which are formed by means of fluid jet weaving may be most preferred, although, as noted previously, weaving on jacquard and/or dobby looms also permits seam production without the need for any further labor-intensive sewing or welding operations.

In the event that a coating is utilized on one or more material panels, neoprene, silicone urethanes or disperse polyamides may be preferred. Coatings such as dispersed polyamides having dry add on weights of about 0.6 ounces per square yard or less and more preferably about 0.4 ounces per square yard or less and most preferably about 0.3 per square yard or less may be particularly preferred so as to minimize fabric weight and enhance foldability. It is, of course, to be understood that aside from the use of coatings, different characteristics in various panels may also be achieved through the use of fabrics incorporating differing weave densities and/or finishing treatments such as calendaring as may be known to those in the skill of the art.

While the airbag cushions according to the present invention have been illustrated and described herein, it is to be understood that such cushions may also include additional components such as shape defining tethers, gas vents, and the like as may be known to those in the skill of the art.

With regard to comparable airbag cushions, the following table presents comparative seam usage factors for other well known and commercially available airbag cushions. The labels used are those used within Standard & Poor's DRI, a well known publication which denotes many different types of products offered for sale to the automotive industry.

TABLE 1

Seam Usage Index Factors for Comparative Commercially Available Airbag Cushions

| S&P DRI Number (A/B) | Total Length of Total Seams (m)("A") | Available Inflation Airspace Volume (L)("B") | Seam Usage Factor |
| --- | --- | --- | --- |
| GM-C4 | 12.42 | 95.00 | 0.1307 |
| W202 | 14.83 | 129.00 | 0.1150 |
| GM4200 | 12.43 | 90.00 | 0.1381 |
| 414T | 14.83 | 128.00 | 0.1159 |
| CY | 14.83 | 128.00 | 0.1159 |
| CF | 16.83 | 128.00 | 0.1315 |

The 414T and CF bags listed above are tilted cushions for use in conjunction with relatively horizontal dashboards. The others are used in conjunction with substantially vertically configured dashboards.

Generally, a airbag module manufacturer or automobile manufacturer will specify what dimensions and performance characteristics are needed for a specific model and make of car. Thus, airbag inflation airspace volume, front panel protection area (particularly for passenger-side airbag cushions), and sufficient overall protection for a passenger are such required specifications. In comparison with those commercially available airbag cushions listed above, the inventive airbag cushions which meet the same specifications (and actually exceed the overall passenger protection characteristics versus the prior art cushions) but require less fabric, less seam length for sewing operations, and thus cost appreciably less than those competitive cushions. The dimensions and seam usage factors for the inventive bags (which compare with those in Table 1, above, directly, and as noted) are presented below in tabular form and are the same general shape as those presented within the drawings described above (but with larger pieces of fabric panels, etc.):

TABLE 2

Seam Usage Index Factors for Inventive Airbag Cushions in Correlation to the S&P DRI Numbered Airbag Cushions Requiring Similar Dimensions and Performance Characteristics

| Correlated Bags by S&P DRI Number (A/B) | Total Length of Total Seams (m)("A") | Available Inflation Airspace Volume (L)("B") | Seam Usage Factor |
|---|---|---|---|
| GM-C4 | 7.56 | 95.00 | 0.0796 |
| W202 | 6.90 | 129.00 | 0.0535 |
| GM4200 | 7.20 | 90.00 | 0.0800 |
| 414T | 6.90 | 128.00 | 0.0539 |
| CY | 5.35 | 128.00 | 0.0418 |
| CF | 6.90 | 128.00 | 0.0539 |

Clearly, the inventive bags, which possess the same available inflation airspace volume and front fabric panel area as the comparative prior art commercially available cushions (bags), require much less in the way of total seam length, which thus correlates into overall much lower effective seam usage factors. Furthermore, as noted above, in standard crash tests, these inventive bags (cushions) either performed as well as or outperformed their commercially available, more expensive, counterparts.

While specific embodiments of the invention have been illustrated and described, it is to be understood that the invention is not limited thereto, since modifications may certainly be made and other embodiments of the principals of this invention will no doubt occur to those skilled in the art. Therefore, it is contemplated by the appended claims to cover any such modifications and other embodiments as incorporate the features of this invention which in the true spirit and scope of the claims hereto.

What I claim is:

1. An airbag cushion comprising at least
   (a) a first fabric blank and
   (b) a second fabric blank,
   said first and said second fabric blanks connected together through the utilization of at least two seams, wherein said airbag cushion has a first end and a second end such that said first end is closed and said second end is open, said second end forming a mouth opening having a seamed perimeter:
   (c) wherein only one of said at least two seams is in contact with both:
      (i) said first end, and
      (ii) said perimeter of said mouth opening of said second end.

2. The airbag cushion of claim 1 wherein said seam in contact with both said first end and said perimeter of said mouth opening of said second end is substantially straight.

3. The airbag cushion of claim 1 wherein said second end comprises a looped pocket for inflation canister disposition.

4. The airbag cushion of claim 1 wherein said second end exhibits a symmetrical mouth opening for inflation assembly attachment.

5. The airbag cushion of claim 1 wherein said second end exhibits an asymmetrical mouth opening for inflation assembly attachment.

6. A vehicle restraint system comprising the airbag cushion of claim 1.

7. A vehicle restraint system comprising the airbag cushion of claim 2.

8. A vehicle restraint system comprising the airbag cushion of claim 3.

9. A vehicle restraint system comprising the airbag cushion of claim 4.

10. A vehicle restraint system comprising the airbag cushion of claim 5.

11. A vehicle restraint system comprising an airbag cushion made by the method having the following steps
   a) providing a first fabric blank having a first end and a second end with two shared edges, wherein said fabric blank also comprises a cut-out pattern for eventual placement of an inflation canister or attachment to an inflation assembly, and wherein said fabric blank optionally comprises reinforcing layers of fabric attached adjacent to said cut-out pattern;
   (b) folding said first fabric blank of step "a" such that at least one of said shared edges is in complete contact with itself;
   (c) connecting only one of the said at least one shared edge in contact with itself to form a folded composite having a first opening and a second opening, wherein said first opening exhibits edges in a single plane and is wider than said second opening, and wherein said second opening is said cut-out pattern of step "a";
   (d) providing a second fabric blank; and
   (e) connecting said second fabric blank to said edges of said first opening of said folded composite of step "c".

12. The vehicle restraint system according to claim 11, wherein said second opening of step "c" comprises two fabric components which are subsequently connected to form a looped pocket on said airbag cushion.

13. The vehicle restraint system according to claim 11, wherein said fabric reinforcements of step "a" are present.

14. The vehicle restraint system according to claim 11, wherein said second opening on said folded composite of step "c" is symmetrical.

15. The vehicle restraint system according to claim 11, wherein said second opening on said folded composite of step "c" is asymmetrical.

16. The vehicle restraint system according to claim 11, wherein said second fabric blank is substantially rectangular in shape.

* * * * *